Oct. 24, 1961  J. PATERA  3,005,235
AUTOMATIC INJECTION MOLDING APPARATUS
Filed May 6, 1958  4 Sheets-Sheet 1

INVENTOR
JAROMIR PATERA
BY
ATTORNEY

Oct. 24, 1961 J. PATERA 3,005,235
AUTOMATIC INJECTION MOLDING APPARATUS
Filed May 6, 1958 4 Sheets-Sheet 4

INVENTOR
JAROMIR PATERA
BY
ATTORNEY

United States Patent Office 3,005,235
Patented Oct. 24, 1961

3,005,235
AUTOMATIC INJECTION MOLDING APPARATUS
Jaromir Patera, Vernon, France, assignor to Bata Shoe Company, Inc., Belcamp, Md., a corporation of Maryland
Filed May 6, 1958, Ser. No. 733,398
Claims priority, application France May 7, 1957
4 Claims. (Cl. 18—30)

The present invention relates to a machine for automatically manufacturing articles of plastic material such as articles of footwear, which machine may be adapted to an injection molding machine of conventional construction.

It is known that articles such as shoes and other articles of footwear are composed of or incorporate plastic material, being produced in separate molds placed manually before the injection nozzle of an injection molding apparatus or the like. This process requires numerous operators and also dexterity of manipulation upon which the quality of the articles depend. Special extruding machines are also known which comprise devices to which molds for the article to be manufactured are secured, but these machines are cumbersome and such devices are suitable only for an extruding machine of a specific type and of specific dimensions.

A machine according to the invention, for molding plastic articles such as articles of footwear and adapted to work in combination with apparatus for supplying molten plastic material to a mold, comprises a carriage, a platform which is rotatably mounted on the carriage and which carries a number of angularly equispaced mold holders, mechanism for rotating the platform step-by-step to bring the mold holders one-by-one into register with said apparatus and for locking the platform during the intervals between the steps, means for moving the carriage to and from said apparatus to bring the registering mold holder into engagement with said apparatus while the platform is locked, and devices actuated by the moving parts of the machine to start and stop the movements and operations in timed sequence as a continuously recurring cycle.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 1:
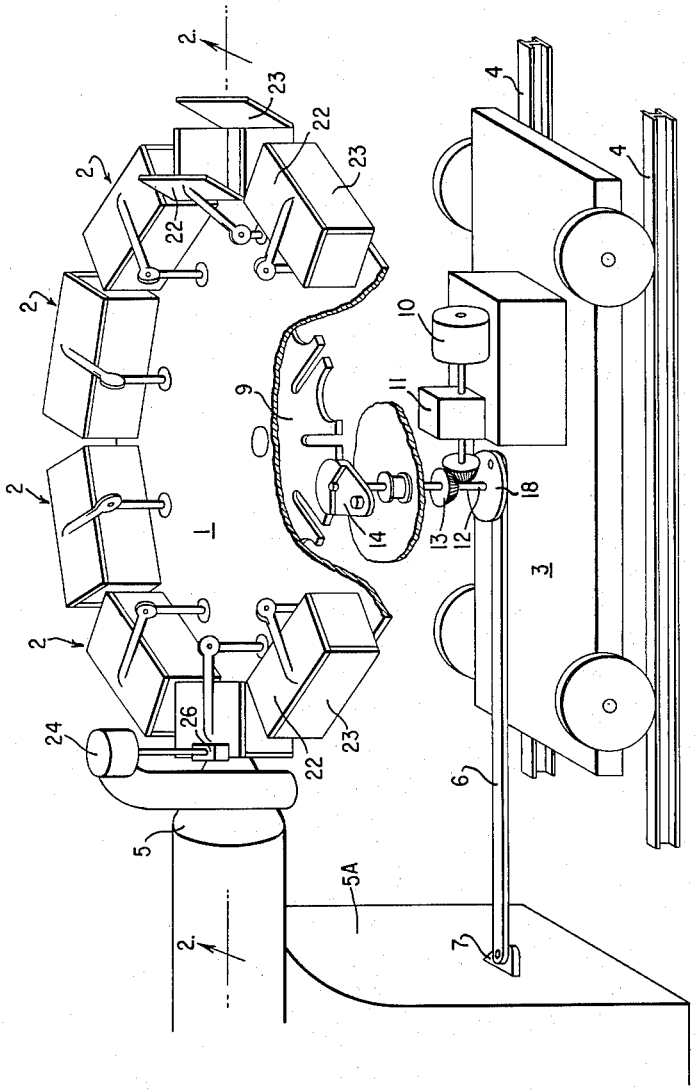
FIG. 1 is a diagrammatic view in perspective of a machine in accordance with the present invention, parts being broken away for clarity of illustration.

The machine comprises a step-by-step rotatable platform 1 on which are mounted angularly equispaced mold holders 2; in the example, there are ten of these holders. The platform is mounted on a reciprocable carriage 3 which moves on rails 4 in such a manner as to successively position the mold holders one by one, with the associated mold in register with the nozzle 5 of an injection molding apparatus 5A of the extrusion type, and to retract the holders from the nozzle.

The movements of the platform 1 are effected by a single motor 10 which is mounted on the platform 3 and drives, through a gear reduction unit 11, output shaft 12 and bevel gears 13, a rotary pawllike driver component 14 of a Maltese cross mechanism. The Maltese cross 9 is secured to the underside of the platform 1, which has a central shaft 1A journaled in a bearing 1B on the carriage 3, FIG. 2. As usual with Maltese cross mechanisms, the driver 14 turns the cross 9 step-by-step and locks it against rotation during the intervals between the steps; and the platform 1 turns with the cross and is locked with it.

The shaft 12 also has secured to it any appropriate eccentric or crank 18 connected to a push-pull rod 6 pivotally connected to an anchorage pin 7 on the frame of the machine 5A. The rotation of the crank 18 brings the carriage 3 towards the nozzle 5 of the injection molding apparatus 5A and also retracts it therefrom.

Contacts 15 and 16 in an electric circuit are actuated during the motion of the machine by a striker or strikers rotating with the shaft 12 or any other appropriate element of the machine. These contacts actuate electromagnetic relays which control time switches or other electrical devices controlling the continuously recurring cycle of operations, which is as follows:

(1) The carriage 3 is advanced to position a mold in a holder 2 in register with the injection nozzle 5, the platform 1 being meantime locked by the Maltese cross mechanism, and the machine is temporarily stopped.

(2) The injection operation is started by a time switch device 29, 30, which is actuated as the carriage nears the end of its advance and which is timed to maintain the injection operation for a period according to the weight of the article to be manufactured. During this operation, a predetermined amount of molten plastic material is supplied to the mold.

(3) The time switch halts the injection operation and causes the machine to be restarted.

(4) The carriage 3 is retracted to disengage the mold and to leave the injection nozzle 5 free for the next operation.

(5) At the limit of the rearward movement of the carriage, the platform 1 is caused to turn one step (in the present case, $\frac{1}{10}$ of a revolution) by the Maltese cross mechanism 9, 14.

(6) When the Maltese cross action ceases and the platform is again locked, the carriage 3 is again advanced, bringing the next mold into register with the injection nozzle 5.

Figure 4:
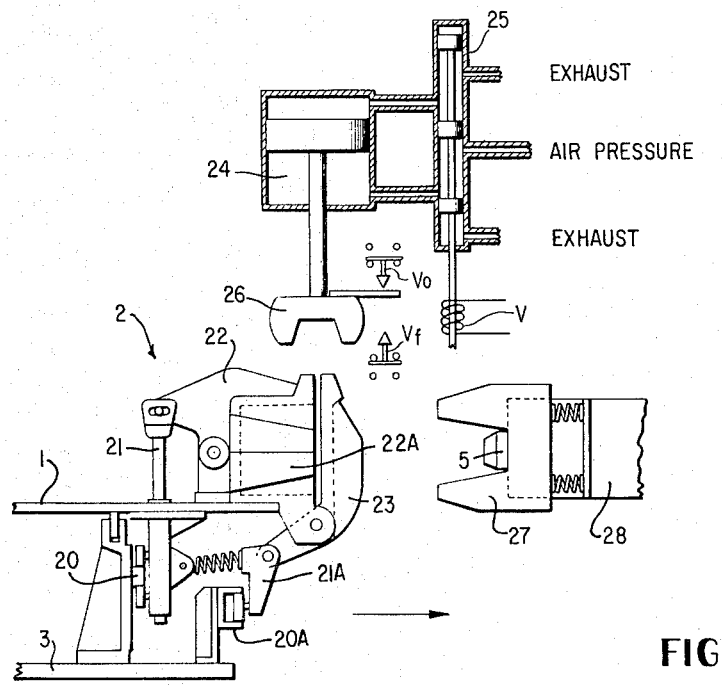
FIG. 4 is an enlarged diagrammatic side view, partly in section, showing mechanisms for closing and locking the molds.

As shown in FIG. 4, the holder of the mold positioned for injection is closed by the action of two ramps 20 and 20A which are attached to the carriage 3. Each of these ramps is a camlike device. The ramp 20 acts on rollers carried by a vertical slide rod 21 which serves to close the upper part 22 of the mold holder 2 against the stationary lower part 22A. The ramp 20A acts on a roller carried by a spring pressed lever 21A which extends from the mold cover 23, and which acts to close the cover 23 against the body 22, 22A of the holder 2. When the carriage is fully advanced and preparatory to the injection operation, the cover 23 is clamped to the body by a double-acting piston 24, of compressed air type, mounted on the machine and controlled by a valve 25. This valve is electrically controlled, for instance, by means such as the switch contacts V$f$ and V$o$. The rod of the piston has a block with jaws 26 of suitable shape which clamps the cover 23 firmly against the upper body part 22 of the holder 2 and maintains it in this position, the two parts being thus locked together. Suitably shaped jaws 27, on a block which is spring urged toward the mold and movable against the spring action on the head 28 of the injector, clamp the upper and lower parts 22, 22A of the closed mold together and to the injection nozzle 5, thus preventing the mold from opening under the pressure of the injected material.

Figure 2:
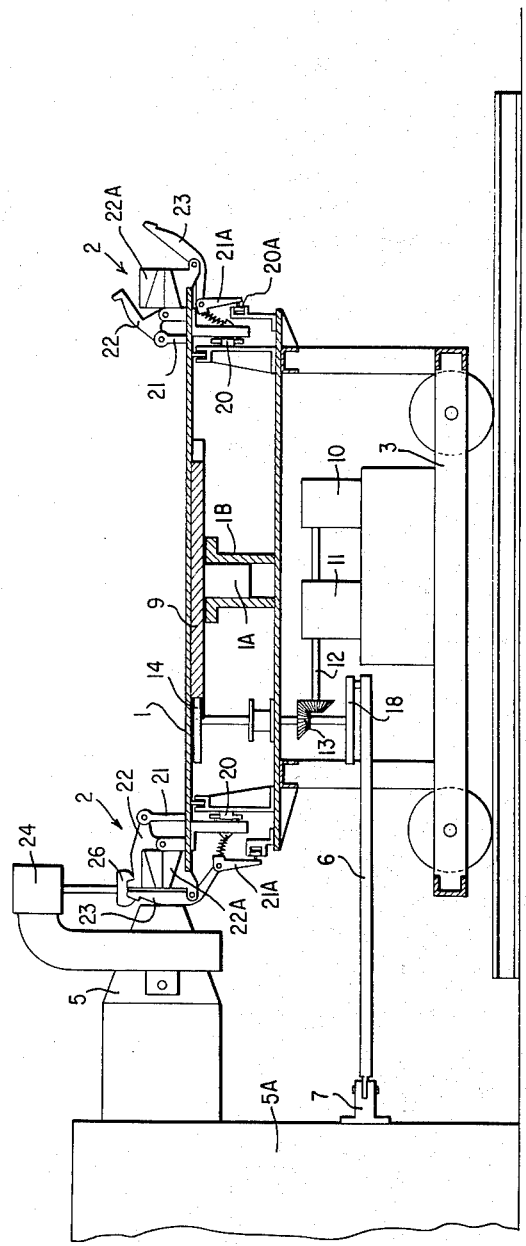
FIG. 2 is a diagrammatic cross-sectional view taken on line 2—2 of FIG. 1.

The mold is released, the carriage retracted and the holder and mold are opened once more by the same mechanisms operating in reverse order, as shown at the right side of FIG. 2.

If desired, a special contact may be provided which enables a mold to be engaged with and retracted from the injection nozzle without actuation of this latter, so that if for any reason the particular article is not required, this mold is not filled.

The injection apparatus may have various time switches, each of which is regulated according to the weight of an article to be produced and is actuated selectively by a stud suitably placed at a different point on the mold box. It is thus possible to produce different articles during the same cycle and without dismounting any part, for instance, up to ten individual shoes or five pairs of shoes, of different models or sizes in the case of a ten-mold platform such as shown in the drawings.

Figure 3:
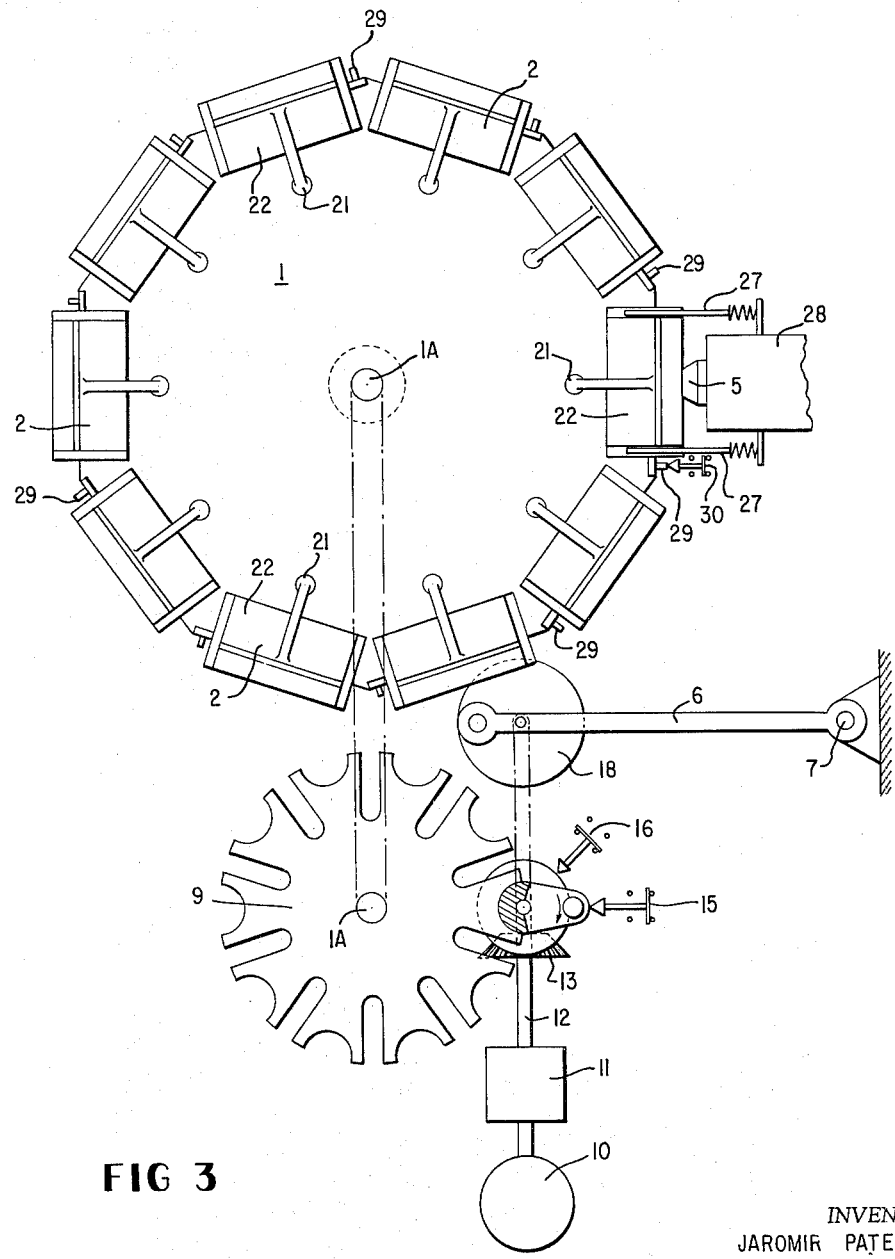
FIG. 3 is an enlarged diagrammatic exploded plan view of parts of the machine, with some parts reoriented for convenience of illustration.
Figure 5:
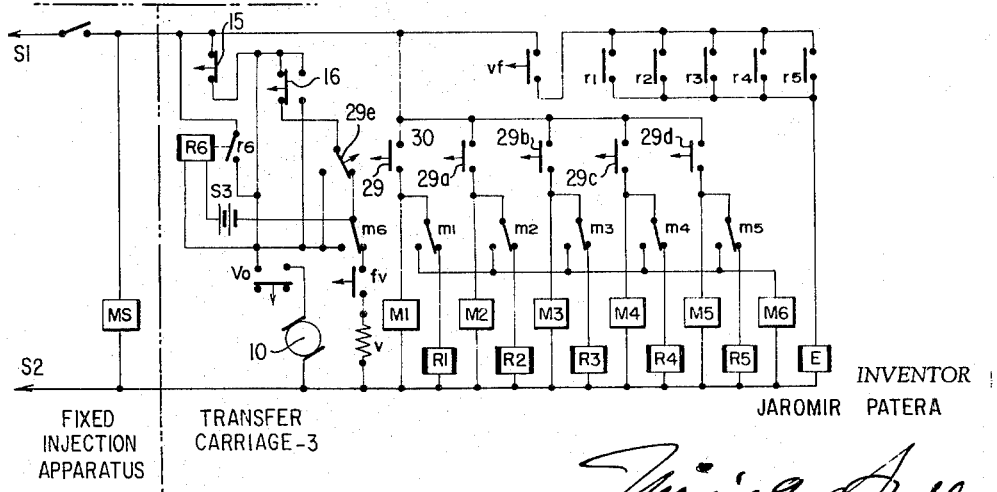
FIG. 5 is a simplified circuit diagram showing essential electrical connections of the machine.

In FIG. 5 is shown a simplified schematic circuit diagram of the machine from which speed and thermal controls as well as other refinements have been omitted. In the diagram a series of time delay devices M1—M5 comprising motors or other suitable timing assemblies are provided for selective operation from 1–30 seconds. Device M6 is utilized when no injection to a particular mold is desired. Switches 29—29e respectively actuate the delay devices and these are normally mounted together at each mold holder for selective operation as indicated by 29 in FIG. 3. The delay device contacts m1—m6, respectively, energize relays R1—R6 whose contacts are shown at r1—r6. The injection motor MS is shown at the left of the circuit diagram and is provided with an electromagnetic clutch E carried by the carriage 3, which energizes a screw for pushing the plastic through the injection nozzle 5. It will be apparent from examination of the circuit diagram that the machine will operate as follows. The carriage motor 10 is energized from the source of power S1, S2 through the normally closed switches 15 and Vo. When the carriage has reached the limit of its motion toward the injection nozzle 5, switch 15 is opened, as shown in FIG. 3, and the motor 10 and carriage 3 are stopped. At this time, switch contact 29, carried by the mold housing, has engaged contact 30 carried by the injection nozzle to close a circuit to the timing device M1 and the relay R1 for a given period of time, say one second. This closes the relay contact r1 through the switch Vf which at this time has been operated by movement of the part 26, FIG. 4, downwardly to lock the mold cover 23 closed. As a result, the magnetic clutch E is operated through relay contact R1 so that material is injected for the period in which the delay device M1 acts. When this period is over, contact m1 moves to close a circuit to delay device M6 and r1 opens to stop the injection. This device then operates for a short waiting period at the end of which contact m6 is moved to energize relay R6 through source S3 closing switch contact r6 to reenergize the carriage motor 10. The carriage therefore will move away from the injection nozzle turning the platform through 1/10 of a turn by reason of the action of the Maltese cross, and, upon again moving forward toward the injection nozzle, engage the next mold with the injection nozzle to repeat the electrical cycle described above. When the contact m6 moves to energize the motor, it simultaneously breaks the circuit to the valve magnet coil V so the valve 25 will operate and lift the locking part 26 from the mold. When the locking head 26 moves up, it operates the switch Vo to close the circuit to motor 10 so that it may run or start when r6 is open. When the locking head 24 moves down, it operates switch Vf to start the screw of the extruder as previously explained.

The special contact 29e may be arranged to be selectively engaged when a particular mold is to be permitted to be engaged with and to be retracted from the injection nozzle without actuation of the latter. When this happens, none of the time delay devices and associated relays R1—R5 are energized, but instead relay R6 closes its contact r6 and insures the continuous running of the motor 10.

Although a certain specific embodiment of the invention has been shown and described, it is obvious that many modifications thereof are possible. The invention, therefore, is not to be restricted except insofar as is necessitated by the prior art and by the spirit of the appended claims.

I claim:

1. A machine for molding plastic articles comprising an injection head including a discharge nozzle, a carriage disposed adjacent said injection head, a platform rotatably mounted on said carriage, means for rotating said platform in step-by-step fashion to index said platform relative to said injection head and including mechanism to operate the injection apparatus in timed relation to such indexing, a plurality of molds mounted on said platform for disposition successively in registry with said nozzle as the platform is indexed, each mold including a lower body part fixed to the platform, a front cover pivotally mounted for movement toward and away from said lower body part, and an upper body part pivotally mounted for movement toward and away from said lower body part, means for moving said front cover and upper body parts of the mold toward and into engagement with said lower body part as that particular mold is moved to indexed position, and means carried by said injection head and engageable with said mold parts for locking the several mold parts together during injection.

2. The machine according to claim 1 wherein said mold locking means includes a jaw device reciprocally carried by said injection head and operative for clamping the upper and lower body parts together.

3. The machine according to claim 2 wherein said mold locking means also includes a cylinder and piston mechanism mounted above said injection head for vertically reciprocative movement of said piston toward and from said head, said piston carrying a jaw device at its lower end for clamping the front cover and upper body part.

4. The machine according to claim 1 wherein said front cover and said upper body part each include operating means extending beyond said platform toward said carriage, and means on said carriage cooperative respectively with said operating means for moving said front cover and upper body part toward the lower body part as the particular mold moves to indexed position and away from the lower body part as such mold moves from indexed position and after the molded material is set.

References Cited in the file of this patent

UNITED STATES PATENTS

| | | |
|---|---|---|
| 2,080,783 | Petersen | May 18, 1937 |
| 2,333,056 | Thoreson et al. | Oct. 26, 1943 |
| 2,402,805 | Cousino | June 25, 1946 |
| 2,498,264 | Goldhard | Feb. 21, 1950 |
| 2,518,594 | Blanchard et al. | Aug. 15, 1950 |
| 2,526,797 | Ashbaugh | Oct. 24, 1950 |
| 2,699,574 | Gilbert | Jan. 18, 1955 |

FOREIGN PATENTS

| | | |
|---|---|---|
| 1,128,105 | France | Aug. 20, 1956 |

OTHER REFERENCES

British Plastics, December 1956, vol. 29, No. 12, pp. 442 and 443, published by Iliffe & Sons, Ltd., London, England.